(12) United States Patent
Goldenbaum

(10) Patent No.: US 12,009,661 B2
(45) Date of Patent: Jun. 11, 2024

(54) PASSIVE REACTIVE COMPENSATION FOR A WIND POWER PLANT

(71) Applicant: Siemens Gamesa Renewable Energy A/S, Brande (DK)

(72) Inventor: Nikolaus Goldenbaum, Ry (DK)

(73) Assignee: Siemens Gamesa Renewable Energy A/S, Brande (DK)

(*) Notice: Subject to any disclaimer, the term of this patent is extended or adjusted under 35 U.S.C. 154(b) by 0 days.

(21) Appl. No.: 17/928,804

(22) PCT Filed: May 18, 2021

(86) PCT No.: PCT/EP2021/063175
§ 371 (c)(1),
(2) Date: Nov. 30, 2022

(87) PCT Pub. No.: WO2021/249730
PCT Pub. Date: Dec. 16, 2021

(65) Prior Publication Data
US 2023/0231385 A1    Jul. 20, 2023

(30) Foreign Application Priority Data
Jun. 9, 2020  (EP) .................................. 20178875

(51) Int. Cl.
H02J 3/00       (2006.01)
H02J 3/18       (2006.01)
H02P 9/02       (2006.01)

(52) U.S. Cl.
CPC . *H02J 3/18* (2013.01); *H02P 9/02* (2013.01)

(58) Field of Classification Search
CPC ........ H02J 3/18; H02J 2300/28; H02J 3/1821; H02P 9/02; Y02E 10/76; Y02E 40/30
See application file for complete search history.

(56) References Cited

U.S. PATENT DOCUMENTS

| 8,432,052 B2 * | 4/2013 | Lu ............................ H02J 3/50 |
| | | 700/286 |
| 2013/0155734 A1 | 6/2013 | El-Barbari et al. |
| 2013/0200621 A1 * | 8/2013 | Andresen .............. F03D 7/0284 |
| | | 290/44 |
| 2020/0083829 A1 | 3/2020 | Kruse et al. |

FOREIGN PATENT DOCUMENTS

| EP | 2397688 A1 | 12/2011 |
| EP | 2541718 A1 | 1/2013 |

OTHER PUBLICATIONS

International Search Report and Written Opinion of the International Searching Authority dated Jul. 14, 2021 for application No. PCT/EP2021/063175.

* cited by examiner

Primary Examiner — Julio C. Gonzalez
(74) Attorney, Agent, or Firm — Schmeiser, Olsen & Watts, LLP

(57) ABSTRACT

A method of transmitting reactive power between at least one wind turbine and a power system through a transformer connected between the at least one wind turbine and the power system, the wind turbine including a power converter. The method includes a second step of connecting at least one passive device to the transformer and reducing or increasing a reactive power of the power converter of an amount corresponding to the reactive contribution from the passive device.

4 Claims, 3 Drawing Sheets

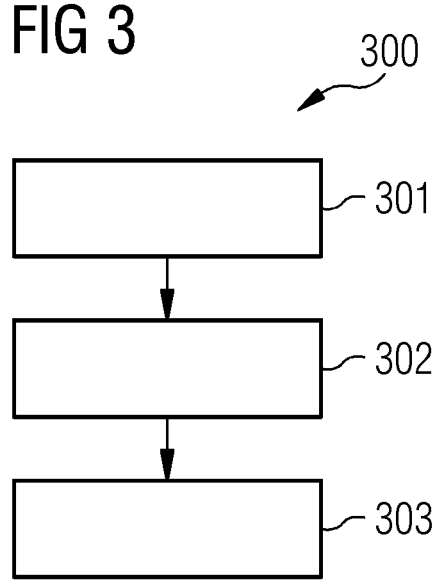
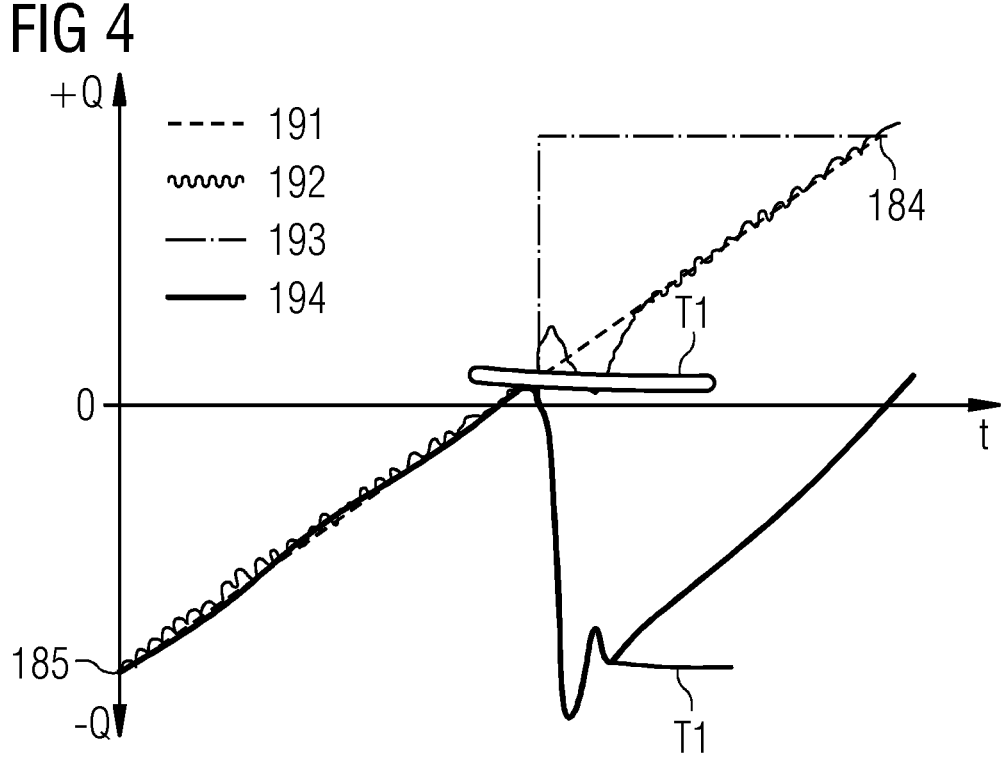

PASSIVE REACTIVE COMPENSATION FOR A WIND POWER PLANT

CROSS-REFERENCE TO RELATED APPLICATIONS

This application claims priority to PCT Application No. PCT/EP2021/063175, having a filing date of May 18, 2021, which claims priority to EP Application No. 20178875.9, having a filing date of Jun. 9, 2020, the entire contents both of which are hereby incorporated by reference.

FIELD OF TECHNOLOGY

The following relates to the technical field of connecting a wind power plant to a power system. Specifically, the following relates to a transmission apparatus and to a method for providing reactive power to the electrical power system and at the same time transmitting electrical power between wind turbine generators and a power system while optimizing the operation of the overall system.

BACKGROUND

Electric power which has been generated by a wind power plant is transmitted to a power system, for example a utility grid, by a transmission apparatus including one or more transformers. The wind power plant and therefore the wind turbines are required to provide reactive power to facilitate the local and remote voltage control in the power system. The reactive power from the wind turbines is dynamically controlled within a certain range by the wind turbine controllers and/or by the wind power plant controller(s).

Provision of reactive power to the power system by means of the wind turbine power converters generally requires some current (Ampere) headroom, which can therefore not be utilized for active power. Reactive power export from the wind turbine to the power system requires the converter PWM (Pulse-width modulation) voltage at the converter PWM terminals to be higher than then maximum open circuit voltage which can be expected at the high voltage side of the transformer of the transmission apparatus. The actual amount of extra (higher) voltage required at the PWM terminals is determined by the effective impedance of the portion of the transmission apparatus comprised between the high voltage terminals of the transformer and the PWM terminals and the active/reactive power operating range. Given that the power converter normally has a maximum achievable PWM voltage, the needed high voltage puts a limitation on the highest nominal (matching) voltage which can be selected (accepted) at the secondary side of the transformer. The maximum achievable PWM voltage can be limited by many factors including available technologies, component selection, standards requiring staying below a certain voltage, etc. The nominal voltage of the secondary side of the transformer is normally controlled by the selection of turns ratio within the transformer. If the nominal (matching) voltage is decreased, the required converter current is increased, and this consequently increases losses and requires more current (Ampere) headroom from the power converter. An apparatus of the above type for transmitting electrical power generated by at least one wind turbine to a power system is described in EP 2 397 688 A1. A method of transmitting reactive power is disclosed in US 2013/155734.

In general, the wind turbine power converter headroom and especially the wind turbine transformer turns ratio cannot easily be adopted to specific side conditions as the required reactive power range is changed.

Therefore, there is still a need for a more efficient provision of reactive power between the wind power plant and the power system to facilitate the local and remote voltage control requirements in the power system.

SUMMARY

According to one aspect of embodiments of the present invention it is provided a method of transmitting reactive power between a at least one wind turbine and a power system through a transformer connected between the at least one wind turbine and the power system, the wind turbine including a power converter. The method includes:
  a first step of ramping a reactive power from a maximum reactive import towards a maximum reactive export up to when a first threshold is reached,
  a second step of connecting at least one passive device to the transformer and reducing a reactive power of the power converter of an amount corresponding to the reactive contribution from the passive device,
  a third step of ramping the reactive power towards the maximum reactive export up to when the maximum reactive export is reached.

According to another aspect of embodiments of the present invention it is provided a method of transmitting reactive power between a at least one wind turbine and a power system through a transformer connected between the at least one wind turbine and the power system, the wind turbine including a power converter. The method includes:
  a first step of ramping a reactive power from a maximum reactive export towards a maximum reactive import up to when a second threshold is reached,
  a second step of connecting at least one passive device to the transformer and increasing a reactive power of the power converter of an amount corresponding to the reactive contribution from the passive device,
  a third step of ramping the reactive power towards the maximum reactive import up to when the maximum reactive import is reached.

The first and the second thresholds may be a respective fraction of the maximum reactive import or of the maximum reactive import. The first and the second thresholds may be comprised between 2% and 10% of the maximum reactive import or of the maximum reactive import, respectively.

The above-described methods provide an efficient dynamic control of the reactive power.

The methods may be implemented in hardware and/or software and may in particular be performed by a wind turbine controller or a generator controller or a controller of a wind power plant.

BRIEF DESCRIPTION

Some of the embodiments will be described in detail, with reference to the following figures, wherein like designations denote like members, wherein:

FIG. 1 schematically illustrates a transmission apparatus for transmitting electrical power between a wind power plant and a power system;

FIG. 3 illustrates steps of a method for transmitting electrical power between a wind power plant and a power system according to embodiments of the invention;

Figure 5:
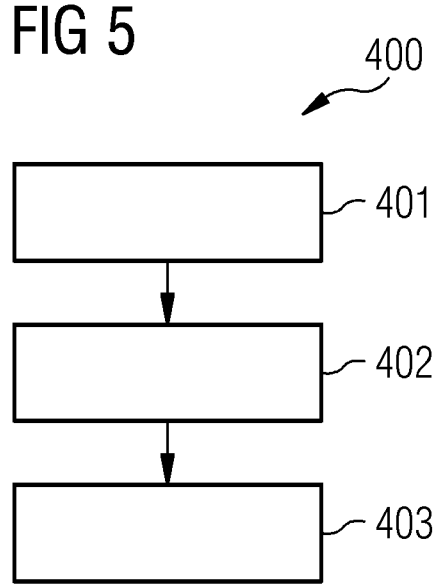
Figure 6:
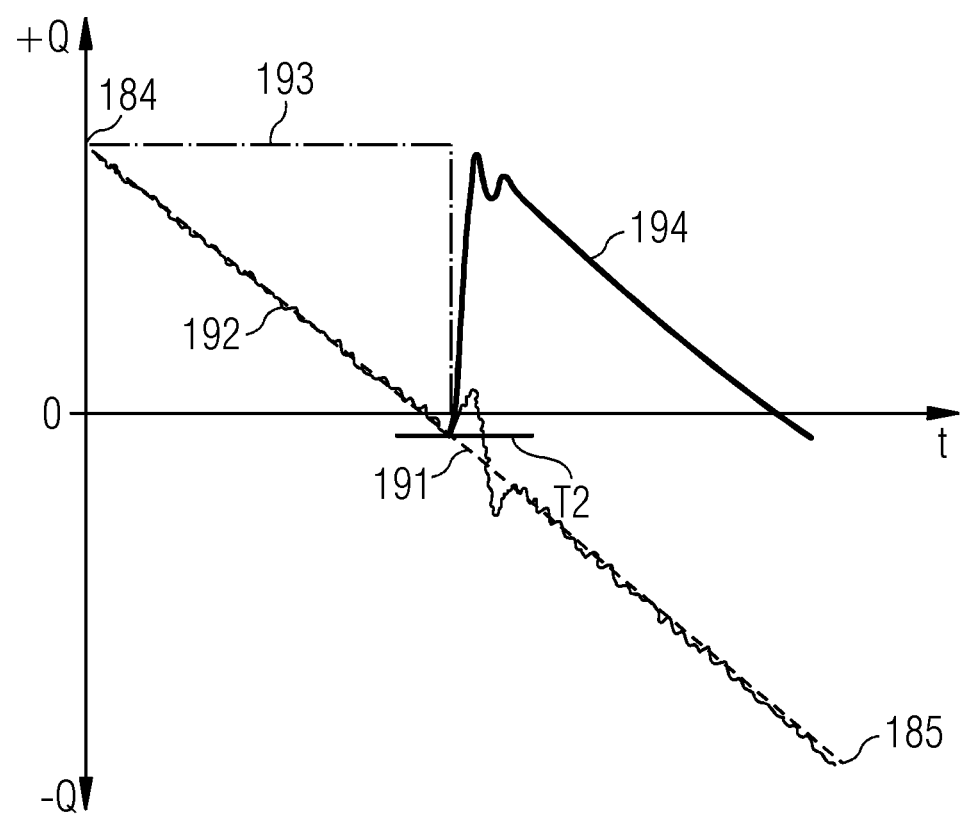

FIG. 4 graphically shows the results of the method of FIG. 3;

FIG. 5 illustrates further steps of a method for transmitting electrical power between a wind power plant and a power system according to embodiments of the invention; and FIG. 6 graphically shows the results of the method of FIG. 5.

DETAILED DESCRIPTION

The illustration in the drawings is in schematic form. It is noted that in different figures, similar or identical elements are provided with the same reference signs.

Figure 1:
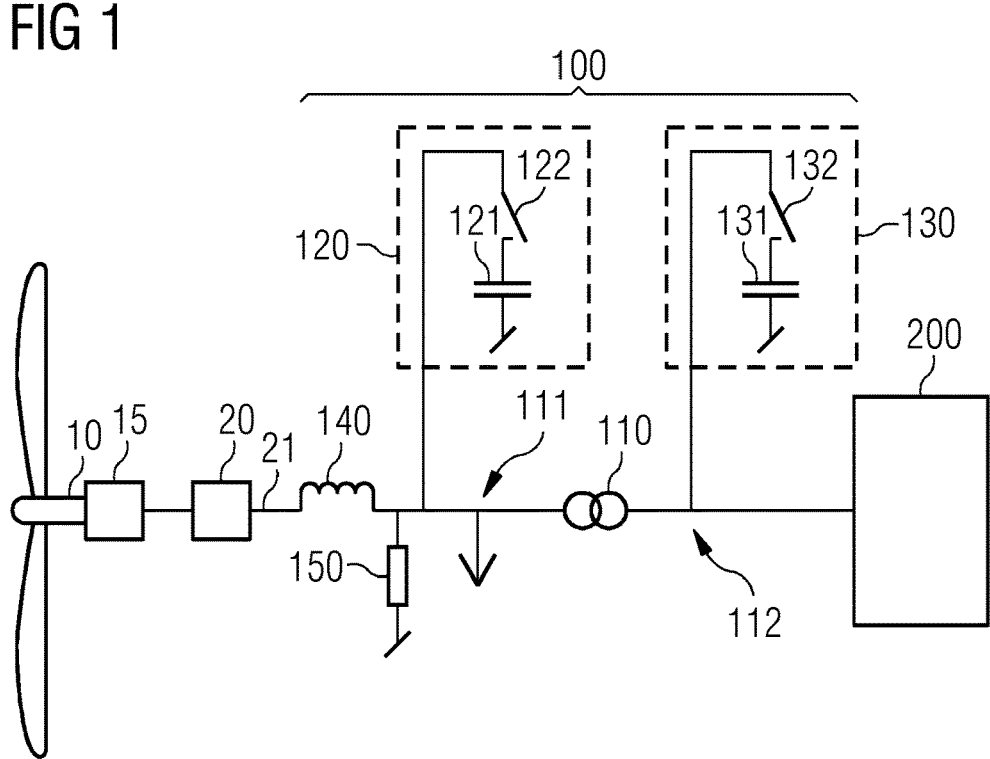

FIG. 1 illustrates a transmission apparatus 100 interposed between a wind power plant 10 and a power system 200. The transmission apparatus 100 is represented according to a single line scheme, but may be a 3-phase system, where the single line of FIG. 1 represents alone the three conductors of a typical 3-phase system. The wind power plant 10 may include one or more wind turbines (one wind turbine 10 is represents in the schematic drawing of the embodiment in FIG. 1). The wind power plant 10 may be an off-shore wind power plant or an off-shore wind power plant. The power system 200 may consist of a utility grid. The transmission apparatus 100 is connected to the power plant 10 and to the power system 200 for transmitting the electrical power generated by the wind power plant 10 to the power system 200. Each wind turbines of the wind power plant 10 includes an electrical generator 15 (one electrical generator 15 is represents in the schematic drawing of the embodiment in FIG. 1). Each wind turbines of the power plant 10 further includes a wind turbine power converter 20 (one wind turbine power converter 20 is represents in the schematic drawing of the embodiment in FIG. 1). The wind turbine power converter 20 is connected to the electrical generator 15. The wind turbine power converter 20 outputs a PWM (Pulse-width modulation) voltage 21, which may be provided as input to the transmission apparatus 100.

The transmission apparatus 100 comprises a transformer 110 which is connectable between the wind power plant 10 and the power system 200. According to other embodiments of the present invention (not shown) the transmission apparatus 100 may comprise more than one transformer 110. The transformer 110 is configured for changing in operation a first AC voltage level provided by the wind power plant 10 to a second AC voltage level to be provided to the power system 200. The transformer 110 comprises a first side 111 for receiving the first AC voltage level and a second side 112 for transmitting the second AC voltage level. According to embodiments of the present invention, the first AC voltage level may be approximately 690 V and the second AC voltage level may be approximately 66 kV. Embodiments of the present invention may be applied to any transmission apparatus 100 and any transformer 110, independently from the values of the first AC voltage level and the second AC voltage level. The transmission apparatus 100 includes a main reactor 140 connectable in series between the output of the power converter 20 and the first side 111 of the transformer 110. The main reactor 140 may be used for cooperating in controlling the reactive power transmitted along the transmission apparatus 100. The transmission apparatus 100 further includes an impedance 150, having a terminal connected between the main reactor 140 and the first side 111 of the transformer 110. The main reactor 140 and the impedance 150 together form a PWM filter for the PWM voltage output 21. According to other embodiments of the present invention (not shown) such filter may be configured in other ways, e.g., as an LCL filter.

The transmission apparatus 100 further includes at least one passive device 120, 130 having a terminal connected with the first side 111 or with the second side 112 of the transformer 110) for controlling the transmission of reactive power between the power plant 10 and the power system 200. In the embodiment of FIG. 1, the transmission apparatus 100 comprises a first passive device 120 having a terminal connected with the first side 111 of the transformer 110 and a second passive device 130 having a terminal connected with the second side 112 of the transformer 110. According to another embodiment of the invention (not shown), only one passive device 120 is present, which has a terminal connected with the first side 111 of the transformer 110. According to another embodiment of the invention (not shown) only one passive device 130 is present, which has a terminal connected with the second side 112 of the transformer 110. In the embodiment of FIG. 1, the passive devices 120, 130 include a first capacitor 121 and a second capacitor 131, respectively. The capacitors 121, 131 are appropriately sized according to the characteristics of the wind power plant 10, the power system 200 and the transformer 110. For example, according to possible embodiments of the inventions, the first capacitor 121 may have a capacitance comprised between 10 mF and 20 mF while the second capacitor 131 may have a capacitance comprised between 1 μF and 2 μF. According to other embodiment of the invention (not shown), each passive device 120, 130 may include a plurality of respective capacitors, for example a bank of capacitors in parallel. The passive device 120, 130 may alternatively or additionally include other passive components, e.g., a PWM filter or an inductor to limit inrush current or other current limiting devices. Optionally a respective switch 122, 132 may be interposed between a respective passive device 120, 130 and the transformer 110. For example, according to the embodiment of FIG. 1, a first switch 122 may be interposed between the first capacitor 122 and the first side 111 and/or a second switch 132 may be interposed between the second capacitor 132 and the second side 112 of the transformer 110. The passive device 120, 130 may further include overrating individual phase contactors (not shown in FIG. 1), which allow switching on capacitors at equal voltage and disconnecting capacitors at zero current.

Figure 2:
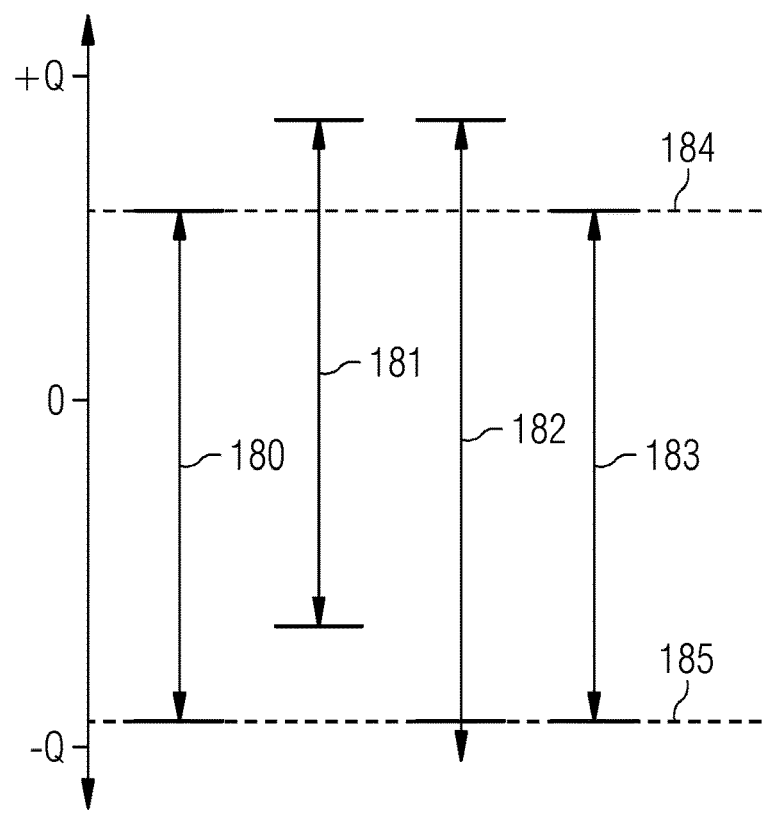
FIG. 2 shows a diagram illustrating reactive power import and export for a wind power plant.

If no switch is interposed between the passive devices 120, 130 and the transformer 110, the passive devices 120, 130 are permanently connected the transformer 110 to provide a fixed reactive power offset. If the switches 122, 132 are used the capacitors can be controlled dynamically, for example to move from a maximum import reactive power to a maximum export reactive power or vice versa. The decision on whether to have the passive devices permanently connected or via a switching device may be based on the conditions show in FIG. 2, where three ranges 181, 182 183 of required reactive power are compared with the base range 180 of reactive power capability of the wind power plant 10, extending between a maximum reactive export 184 and a maximum (negative) reactive import 185. A first range 181 extends between a required reactive power export which is higher than the maximum reactive export 184 and a required reactive power import which is equal or smaller (in absolute value) then the maximum reactive import 185. In such case the passive devices 120 130 may be permanently connected, i.e. the switches 122, 132 are not required. A second range 182 extends between a required reactive power export which is higher than the maximum reactive export 184 and a required reactive power import which is equal or bigger (in absolute value) then the maximum reactive import 185. In such case the switches 122, 132 are required to dynamically connect and disconnect the passive devices 120, 130 to the transformer 110. A third range 183 extends from the maximum reactive export 184 to the maximum reactive import 185. Another range (not shown) may extend within the interval from the maximum reactive export 184 to the maximum reactive import 185. In the latter two cases the passive devices 120, 130 may be avoided.

With reference to FIG. 3 and FIG. 4 it is described a method 300 of transmitting electrical power between the wind power plant 10 and the power system 200 by operating the transmission apparatus 100. According to the method 300 the reactive power is moved from the maximum reactor import 185 to the maximum reactive export 184. In a first step 301 of the method 300, a reactive power reference 191 is ramped from import towards export with a desired ramp rate. The actual reactive power 192 follows the reference 191 up to a threshold T1. The threshold T1 is in the positive range of export reactive power and may be defined as a percentage of the maximum reactive export 184. For example, the threshold T1 may be 5% of the maximum reactive export 184. The threshold T1 may be alternatively defined as absolute value in VA (Volt-Ampere) units. The threshold T1 should be selected high enough to minimize number of switching (this can be achieved several times is the threshold is too low due to hysteresis phenomena). In a second step 302 of the method 300, when the reactive current power 192 reaches the threshold T1, the passive device 120, 130 is connected (reference 193) through the respective switch 122, 132 and at the same time step the reactive power 194 of the power converter 20 is reduced of an amount which corresponds to the reactive contribution from the passive device 120, 130. Such amount of reactive power may be a fixed offset or may be calculated dynamically to match the prevailing operating conditions. In a third step 303 of the method 300, the reactive power reference 191 is ramped again from import towards export with a desired ramp rate, which may be the same as in the first step 301. After a transient, the actual reactive power 192 follows the reference 191 up to the maximum reactive export 184. The second and the third steps 302, 303 may be repeated if each passive device 120, 130 includes a plurality of respective capacitors and switches.

With reference to FIG. 5 and FIG. 6 it is described a method 400 of transmitting electrical power between the wind power plant 10 and the power system 200 by operating the transmission apparatus 100. According to the method 400 the reactive power is moved from the maximum reactor export 184 to the maximum reactive import 185. In a first step 401 of the method 300, a reactive power reference 191 is ramped down from export towards import with a desired ramp rate. The actual reactive power 192 follows the reference 191 up to a threshold T2. The threshold T2 is in the negative range of import reactive power and may be defined as a percentage of the maximum reactive import 185. For example, the threshold T2 may be 5% of the maximum reactive import 185. The threshold T2 may be alternatively defined as absolute value in VA (Volt-Ampere) units. The threshold T2 should be selected high enough (in absolute value) to minimize number of switching (this can be achieved several times is the threshold is too low due to hysteresis phenomena). In a second step 402 of the method 300, when the reactive current power 192 reaches the threshold T2, the passive device 120, 130 is connected (reference 193) through the respective switch 122, 132 and at the same time step the reactive power 194 of the power converter 20 is increased of an amount which corresponds to the reactive contribution from the passive device 120, 130. Such amount of reactive power may be a fixed offset or may be calculated dynamically to match the prevailing operating conditions. In a third step 403 of the method 300, the reactive power reference 191 is ramped again from export towards import with a desired ramp rate, which may be the same as in the first step 401. After a transient, the actual reactive power 192 follows the reference 191 up to the maximum reactive import 185. The second and the third steps 402, 403 may be repeated if each passive device 120, 130 includes a plurality of respective capacitors and switches.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of transmitting reactive power between at least one wind turbine and a power system through a transformer connected between the at least one wind turbine and the power system, the at least one wind turbine including a power converter, the method including:
    a first step of ramping a reactive power from a maximum reactive import towards a maximum reactive export up to when a first threshold is reached,
    a second step of connecting at least one passive device to the transformer and reducing a reactive powder of the power converter of an amount corresponding to the reactive contribution from the at least one passive device,
    a third step of ramping the reactive power towards the maximum reactive export up to when the maximum reactive export is reached.

2. The method of claim 1, wherein the first threshold is a fraction of the maximum reactive export comprised between 2% and 10%.

3. A method of transmitting reactive power between at least one wind turbine and a power system through a transformer connected between the at least one wind turbine and the power system, the at least one wind turbine including a power converter, the method including:
    a first step of ramping a reactive power from a maximum reactive export towards a maximum reactive import up to when a second threshold is reached,
    a second step of connecting at least one passive device to the transformer and increasing a reactive power of the power converter of an amount corresponding to the reactive contribution from the at least one passive device,
    a third step of ramping the reactive power towards the maximum reactive import up to when the maximum reactive import is reached.

4. The method of claim 3, wherein the second threshold is a fraction of the maximum reactive import comprised between 2% and 10%.

* * * * *